US006317958B1

(12) United States Patent
Belanger et al.

(10) Patent No.: US 6,317,958 B1
(45) Date of Patent: *Nov. 20, 2001

(54) METHOD OF ASSEMBLING AND RECONSTRUCTING A CURTAIN STYLE VEHICLE LAUNDRY DEVICE

(76) Inventors: Michael J. Belanger, 21300 Chase Dr., Novi, MI (US) 48375; Robert J. Wentworth, 37924 Stableview, Farmington Hills, MI (US) 48335

( * ) Notice: Subject to any disclaimer, the term of this patent is extended or adjusted under 35 U.S.C. 154(b) by 0 days.

This patent is subject to a terminal disclaimer.

(21) Appl. No.: 09/658,931

(22) Filed: Sep. 11, 2000

Related U.S. Application Data

(60) Continuation of application No. 09/275,912, filed on Mar. 24, 1999, now Pat. No. 6,202,279, which is a division of application No. 08/848,136, filed on Apr. 28, 1997, now Pat. No. 5,924,156, which is a continuation-in-part of application No. 08/641,115, filed on Apr. 29, 1996, now Pat. No. 5,813,076.

(51) Int. Cl.[7] ........................................... B23P 11/02
(52) U.S. Cl. ................................. 29/453; 29/428
(58) Field of Search ............................. 29/248, 453, 428; 15/97.3, 230.15, 230.17, 230.16, DIG. 2

(56) References Cited

U.S. PATENT DOCUMENTS

| 4,057,866 | 11/1977 | Belanger . |
| 4,096,600 | 6/1978 | Belanger . |
| 4,967,440 | 11/1990 | Belanger . |
| 5,127,123 | 7/1992 | Belanger . |
| 5,623,741 | 4/1997 | Clark . |
| 5,784,748 | 7/1998 | Belanger et al. . |
| 6,202,279 | * 3/2001 | Belanger et al. . |

FOREIGN PATENT DOCUMENTS

WO 97/41486 * 11/1997 (WO) .

* cited by examiner

Primary Examiner—S. Thomas Hughes
Assistant Examiner—Steven A Blount
(74) Attorney, Agent, or Firm—Young & Basile

(57) ABSTRACT

A laundering implement is provided for cleaning an external surface of a vehicle. A plurality of spacers are supportable with respect to a path of travel for a vehicle to be cleaned and are arranged in first and second stacked or sandwiched groups of spacers for oscillating or rotating movement about a common axis of rotation or axial shifting oscillation along a common axis. The spacers are of a color different from that of the rest of the fixed structure of the laundering implement so that when the implement is in operation the moving spacers and cloth elements create an attractive and attention-getting visual effect. The colors of the spacers may be customized to suit the desires of any particular purchaser or operator of the vehicle laundry system. Each spacer has opposite complementary faces matable with an opposing face of an adjacent spacer. A plurality of cloth elements are interposed between adjacent stacked spacers for movement in concert therewith. At least a portion of a cloth element is interposed between adjacent spacers. The interposed portion of the element is pinched between a projection extending from one spacer and into engagement with the adjacent spacer, and the cloth element and adjacent spacers are compressively sandwiched toward one another.

3 Claims, 6 Drawing Sheets

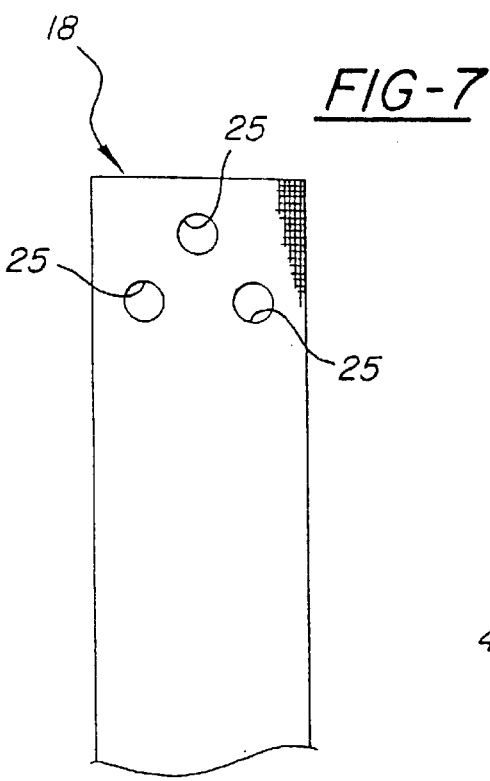
FIG-7
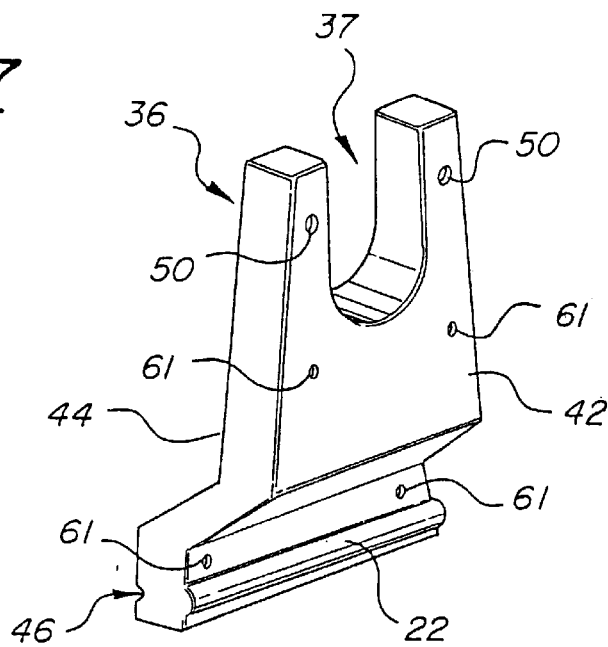
FIG-8
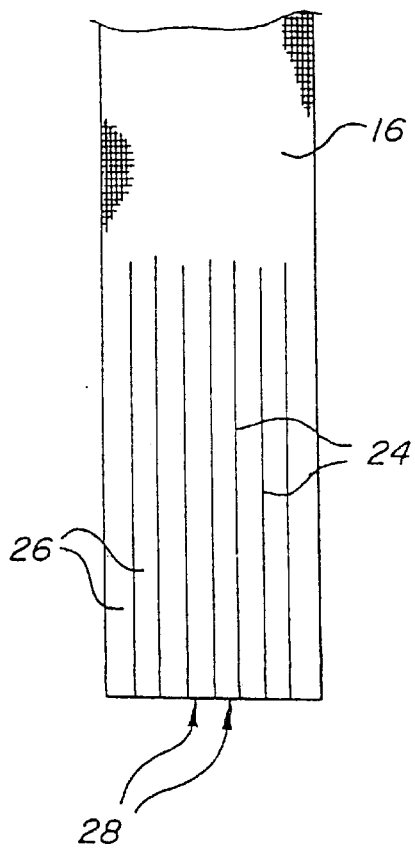
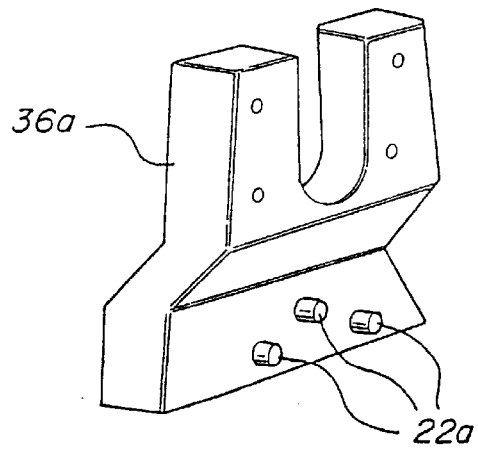
FIG-8a

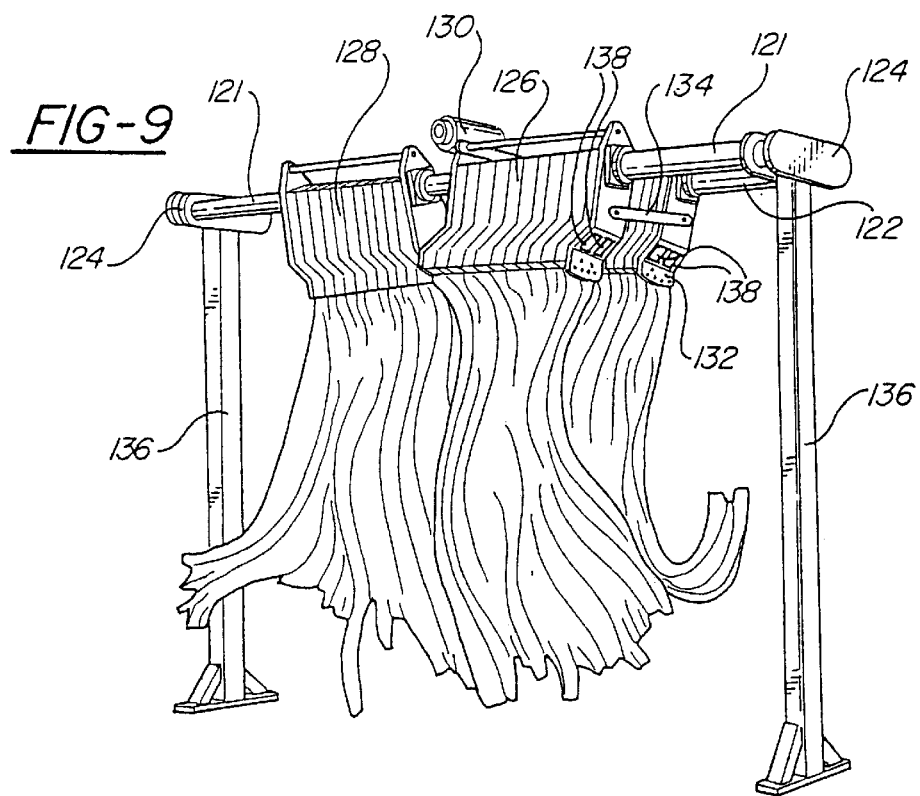
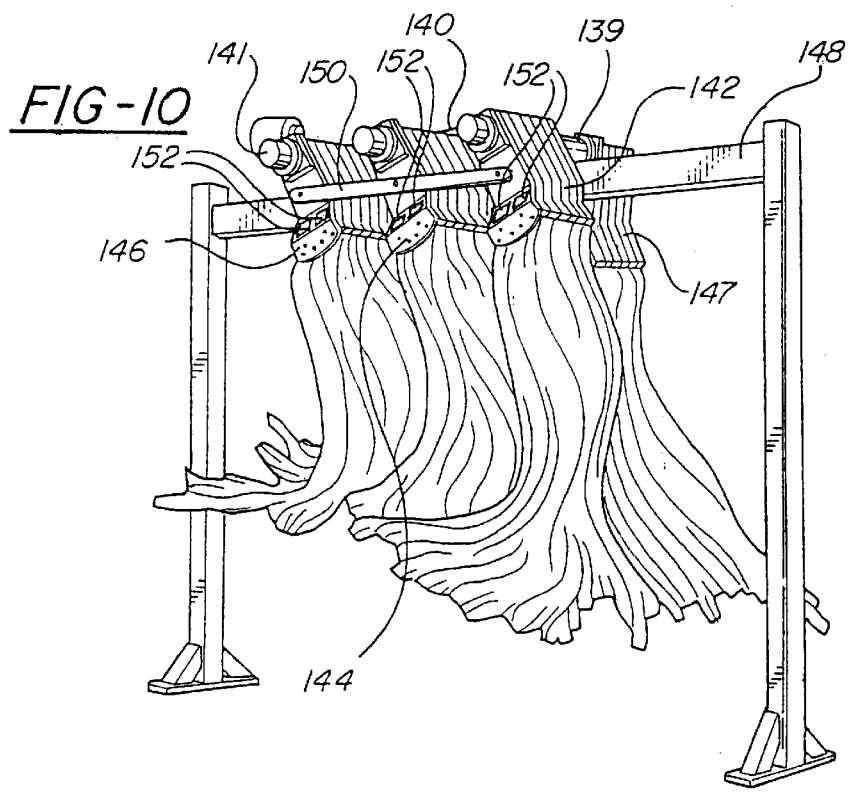

METHOD OF ASSEMBLING AND RECONSTRUCTING A CURTAIN STYLE VEHICLE LAUNDRY DEVICE

RELATED PATENT APPLICATIONS

This application is a continuation of Ser. No. 09/275,912 filed Mar. 24, 1999 now U.S. Pat. No. 6,202,279 which is a Divisional of Ser. No. 08/848,136, filed Apr. 28, 1997 which is a Continuation-in-Part of U.S. patent application Ser. No. 08/641,115 "CURTAIN-STYLE VEHICLE LAUNDRY DEVICE," filed Apr. 29, 1996 now U.S. Pat. No. 5,813,176.

FIELD OF THE INVENTION

The present invention relates generally to a vehicle laundering device of the type having multiple depending cloth elements which contact an external surface of a vehicle or other structure to be treated and which are set in motion by an overhead drive assembly. The invention relates in particular to such a laundering device that presents a distinctive and attention-getting visual appearance, which is inexpensive to construct and which facilitates reconstruction by replacement of the cloth elements.

BACKGROUND OF THE INVENTION

Vehicle laundry systems have evolved from designs having rotatable top and side brushes with long polypropylene strands toward the use of brushes and curtains with cloth elements made of non-woven, synthetic felt. The mounting end of the element is typically formed by folding the material of the element back over a plastic insert and thereafter stitching the folded material to form an edge bead which is inserted into a slot formed in a carrier or hub. Examples of this type of vehicle laundry system as applied to brushes can be seen in U.S. Pat. No. 4,055,028 and U.S. Pat. No. 4,018,014.

In a prior art curtain-type device with multiple depending cloth elements, extruded metal slats are assembled in parallel groups and suspended for oscillatory motion over a vehicle lane. The bottoms of the slats are provided with longitudinal keyways which receive the edge bead of the cloth elements. An arrangement of several such slats is typically supported above a vehicle laundering station by means of a four-legged structure constructed of square or rectangular beams. A drive system is typically mounted on a platform in the center of the structure and is connected to the racks by suitable linkages to move them longitudinally or transversely of a wash lane.

Such prior art curtain laundry systems have several drawbacks, each of which is addressed by our invention as set forth herein. First, the overall appearance of the prior art curtain laundry station is "mechanically busy"; i.e., there is a strong sense of the profusion of beams and slats which is at odds with efforts to make vehicle laundries more aesthetically pleasing to the customer, both inside and outside the building.

Second, the prior art curtain-type devices are further lacking in visual appeal to the customer by virtue of being constructed essentially without color; i.e., the device is usually constructed from metal beams and plates which are aluminum or steel color, or may be the color of a corrosion inhibiting paint.

Third, the cost of constructing such a system is high as a result of the quantity of material needed and the labor required to build or assemble the system on site.

Fourth, the support structure takes up a great deal of valuable space and this opposes the increasing demand to include more laundry features and stations in a given conveyor corridor length.

Fifth, where left and right banks of curtain elements are employed in a single support structure, a substantial gap exists between them and this gap may lead to inadequate cleaning of the vehicle along the longitudinal centerline thereof.

SUMMARY OF THE INVENTION

Common to all aspects and/or embodiments of the invention disclosed herein is an improved laundering implement for cleaning or treating an external surface of a vehicle or other article includes a fixed overhead support member, a plurality of replaceable cloth elements having an elongate fabric body engageable with the treated surface, and an interface structure pivotally; i.e., rotatably, mounted directly or indirectly to the support member and adapted to releasably secure and cause motion of the depending cloth elements when actuated by a drive assembly. The term "interface" is used herein to denote a structure which mounts to a stationary assembly but which can move or pivot relative to that assembly and which bridges a space gap between a support assembly and the plurality of depending cloth elements.

According to one aspect of the invention, the interface structure adds a distinctive and attention-getting appearance factor to the structure by carrying one or more surface colors arranged such as to be visible to users of the structure whether they be in an automobile being treated or standing in a pedestrian lane next to the treatment station.

In the preferred form, this is achieved by constructing the interface structure of a material, such as plastic, to which color may be permanently added by dyeing the raw material from which the individual elements of a multi-element interface structure is manufactured.

In an illustrative example, hereinafter described in detail, the interface structure comprises a plurality of hollow plastic spacer bodies pivotally arranged in parallel fashion on an overhead, horizontal support member for concerted motion relative thereto. Means are provided for clamping the spacer bodies in the parallel array with cloth elements between adjacent spacers and depending therefrom to permit easy removal and replacement. The spacers may be uniformly or variably colored to match or contrast with the cloth elements and may be custom colored to either match or serve as a corporate identity logo. This is particularly advantageous for use of the laundry implement in or in connection with a service station or convenience store because the national outlets typically have logos or trade identities of which colors are a prominent part.

As hereinafter described and illustrated in detail with reference to several illustrative embodiments, the curtain is made up of multiple depending cloth elements arranged in a generally vertically extending planar form or an approximation thereof. The cloth elements may be slitted to form vertically extending fingers which contact the surface to be processed. The cloth elements are elongate rectangles, or approximations thereof, and are mounted on and between stacked spacers. The stacked spacers are compressibly clamped to capture and anchor sandwiched cloth elements interposed between adjacent spacers.

The terms "laundering" and "cleaning," as used herein, refer primarily to the operation of wet washing a vehicle, but may also be construed to include wet and dry polishing functions, as well as other processing or treating functions performed by engagement with an external surface of an article, not necessarily a vehicle.

According to another aspect of the invention, individual vehicle laundry brush and/or curtain elements are provided which require no edge bead inserts. The elements are constructed and arranged so as to minimize the time and difficulty involved in attaching the elements to a carrier. The elements are also less expensive to manufacture. In some cases, all stitching can be eliminated from the cloth elements. This can be achieved in various ways, one of which is to die cut holes in the cloth elements, thereby to receive pins extending between adjacent surfaces of the interface spacer bodies. Another way is to create tongue and groove structure in adjacent spacer bodies which capture and hold the cloth elements firmly therebetween.

The laundering implement of the present invention is light in weight, accommodates cloth elements in a stacked or sandwiched array, and facilitates rebuilding or reconstruction of the laundering implement to replace the cloth elements. The laundering implement can include a plurality of carrier or spacer bodies arranged in parallel, stacked or sandwiched relation and having in each case at least one face which lies adjacent to, but not necessarily in contact with a mating face of an adjacent spacer. The spacers can be formed as hollow, lightweight bodies, preferably constructed of color impregnable plastic. Metal end plates by which the spacers are clamped together may be secured to a drive element such that a rotary or oscillatory drive force may be imparted to the spacers and to the cloth elements anchored or captured therebetween.

The spacers comprising the interface structure of an oscillating curtain-type laundering implement are generally rectangular in shape and are stacked horizontally to define a basic outline of the curtain. The adjacent mating faces of the spacers can be non-planar; i.e., constructed with an angular offset to fill any gap formed between alternately oscillated racks of spacers. The spacers may be constructed of hollow lightweight material, such as blow molded or rotocast color impregnable plastic. The spacers may be selectively applied and removed from supported, oscillating relationship with a cross beam by radial movement with respect to the supporting beam member, rather than only through endwise or axial de-stacking. A laundering implement having spacers constructed according to the present invention can be easily rebuilt by loosening compression means acting on adjacent spacers to permit sufficient spreading apart of the spacers to readily remove the individual cloth elements compressively interposed and sandwiched therebetween. The cloth elements are readily removed from the corresponding anchor means supported by the adjacent spacers and replaced with new elements. After all elements have been quickly and easily replaced, the laundering implement is reconstructed into an integral unit by axial clamping and can then be restored to the operative association with other vehicle laundry components. The molded plastic construction of the spacers makes it relatively easy and inexpensive to produce spacers in various different colors, since no painting or coating is required after fabrication.

According to another aspect of the invention, all active and removable elements of a complete overhead curtain assembly can be mounted or a simple, easily constructed, aesthetically pleasing arch structure having only two upright support posts and one or more cross beams connecting the support posts together at the top. A single mitter curtain device may require only one cross beam where a double, synchronized mitter curtain implement may require two parallel cross beams. For longitudinal motion devices, the spacers may be mounted directly to the cross beam which is, in this case, preferably of round cross section. A transverse motion assembly may be provided by mounting one or more short longitudinal bearing beams to the cross beam and mounting the spacers to the longitudinal bearing beams as hereinafter described.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a plan view of a typical cloth curtain element;

FIGS. 8 and 8a are perspective views of a spacer showing two different types of mounting elements for holding the cloth elements between the spacers;

FIG. 9 shows an overhead curtain implement with four spacer stocks; and

FIG. 10 shows an overhead curtain implement with six spacer stacks arranged for transverse motion.

DESCRIPTION OF THE PREFERRED EMBODIMENT

Figure 1:
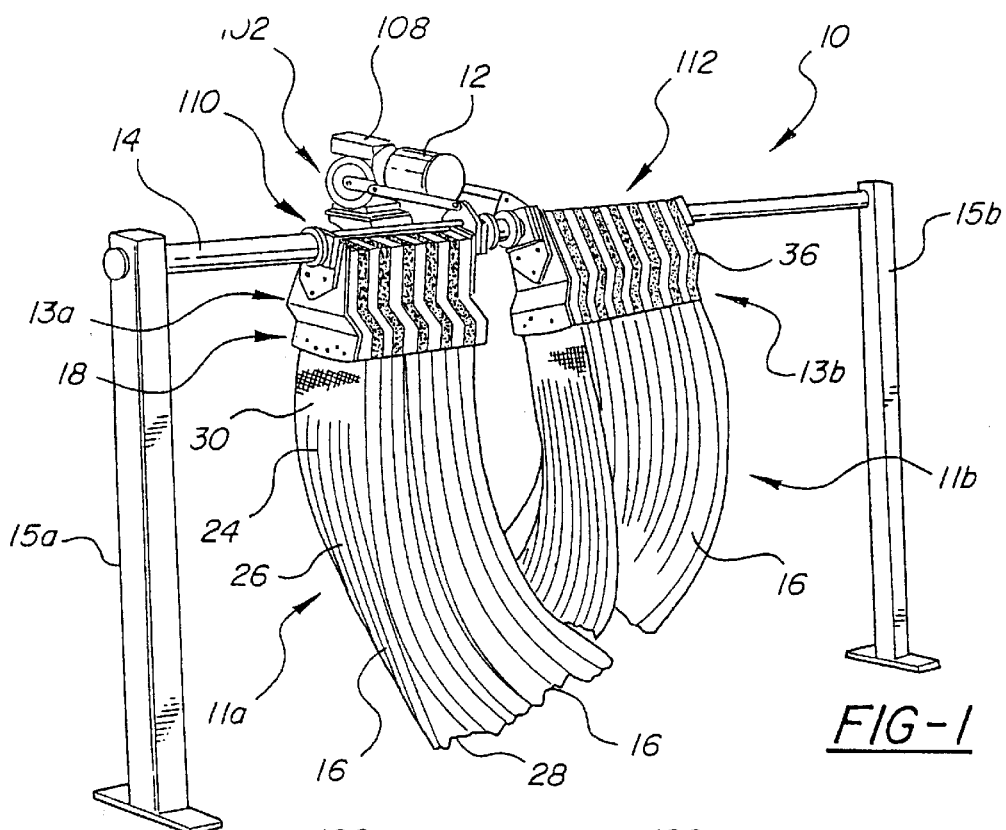
FIG. 1 is a perspective view of a longitudinal motion implement constructed according to the present invention.

FIG. 1 illustrates a laundering implement 10 of the overhead oscillating curtain type comprising left and right curtain banks 11a, 11b depending from a cross beam 14. The banks are made up of respective interface structures 13a, 13b and a plurality of strip-like cloth elements 16 which are carried by and depend from the interface structures. Interface structures 11a, 11b are mounted for axial rotation on a six inch diameter aluminum tubular cross beam 14 and are driven through suitable crank arms by a motor 12 in an oscillating, fore and aft motion. Cross beam 14 is disposed above a vehicle lane by spaced apart, hollow, tubular vertical supports 15a and 15b, the supports having foot plates which can be anchored by bolts and/or other conventional means to a foundation or floor. Implement 10 can be installed as part of a processing system for cleaning or treating an external surface of an article, such as a vehicle passing through the laundry system. Although shown with the direction of oscillatory motion parallel to vehicle travel, it is to be understood that the direction of oscillatory motion may also be laterally of the vehicle.

The functions of the interface structure include (a) providing an easily-released mounting system for replaceable cloth strips 16, (b) providing a structure by which it is possible to impart motion to the strips and (c) adding color(s) to the mechanical structure for distinctiveness, eye-appeal and/or logo identification purposes.

FIG. 7 illustrates in plan view a cloth element 16 from either of the curtain banks 11a and 11b. Element 16 is cut from a sheet of synthetic felt of a type available from Ozite, National Felt and several other manufacturers. Element 16 is rectangular and has a top end 18 for mounting purposes to be described hereinbelow, and a free end 28 for contacting the vehicle being cleaned. Toward the free end 28, the element 16 is longitudinally slitted by parallel cuts 24 into fingers 26 which enhance cleaning action. Toward the top end, holes 25 are die cut through the material.

The cloth elements 16 are typically from about six to eight feet in length, from about 4 to 12 inches in width and are made from polypropylene or polyester material ⅛" to ¼" thick. Because of the unique ways in which they are mounted, they require no folding or stitching to manufacture. It is, however, well within the scope of our invention to reinforce the top end 18 of the elements 16 with stitched or bonded components as the designer sees fit, or even to make the top portion of the element as a separate piece which is suitably attached to a felt body. Such a separate piece may be formed of plastic or some other material and have means thereon adapted for engagement with the spacers.

Referring now to FIGS. 1 through 4, the manner and means by which curtain banks 11a, 11b are assembled will be described in detail. Curtain bank 11a is the mirror image of curtain bank 11b in virtually all respects; therefore, only one curtain bank will be fully described.

Interface structure 13a of curtain bank 11a comprises a horizontal stack of nearly identical, hollow, plastic blow-molded spacers 36 integrated with one another to form a disassemblable unit. Protrusions 48 and mating apertures 50 are disposed on alternate faces of spacers 36 adjacent the upper ends thereof, and male elements such as ridges 22 and female elements such as grooves 46 are likewise disposed on alternate sides of the spacers adjacent the lower ends. Pins and sockets also work well but require holes 25 in the elements through which the pins extend when mounted; see FIG. 7. Tie rods 62, 54 and 84 and end plates 56 serve to compress the stack of spacers, holding it together as a unit. Cloth elements 16 are interposed between the spacers 36 in parallel and at a spacing dependant upon the thickness of spacers 36, and are held in place between the spacers by virtue of being securely engaged by anchor means 38 adjacent the lower ends of the spacers (see FIG. 3) when the spacers are compressed together.

As is typical of prior art vehicle laundering implements, the non-moving structural parts thereof such as cross beam 14 and vertical supports 15a and 15b are constructed of aluminum or steel and are either left in a natural, unpainted state or are painted a substantially uniform color. Spacers 36 are formed in one or more colors different from the color of the non-moving parts for the purpose described above. The spacers may be all of a single color or may be any combination of colors selected by the purchaser or end user of the implement. It is anticipated that a purchaser of the invention vehicle laundering implement will select a color or combination of colors to match or complement the colors of that purchaser's trademark or other logo by which it is recognized in commerce. For example, if the invention vehicle laundering implement is to be located at a service station associated with the Shell Oil Company, the spacers may be formed in the yellow and red colors prominent in the Shell trademark. These spacers may be arranged in an alternating fashion, or in some other repeating pattern within the spacer stacks. Such a two-color, alternating pattern is indicated in the spacer stacks shown in FIGS. 1 and 2, with the spacers of a first color being unshaded and those of a second, contrasting color being shaded.

During operation of the laundering implement, the visual contrast between the color of the fixed structure of the laundering implement and the colors of the spacers is accentuated by the movement of the colored spacers, said movement producing an attention-getting and attractive visual effect which is visible to any person in the vicinity of the implement. This attractive visual effect may be visible to occupants of a vehicle moving through the laundering implement, persons within the building that houses the implement, and persons outside the building in a position to view the implement through windows or open doors of the building.

The color or colors of the material used for brush elements 16 may also be selected so as to provide a visually appealing effect or source identification when the elements are in motion along with colored spacers 36.

Spacers 36 are easily and inexpensively produced in a wide variety of colors by virtue of their molded plastic construction. In most conventionally known plastic molding processes, such as injection molding, blow molding or rotocasting, the color of the molded product is easily changed by varying the color of the plastic used as the raw material. No additional step such as painting or coating is necessary to achieve a desired color, so that the overall price of the spacers is reduced. Of course painted structures can also be used.

Figure 4:
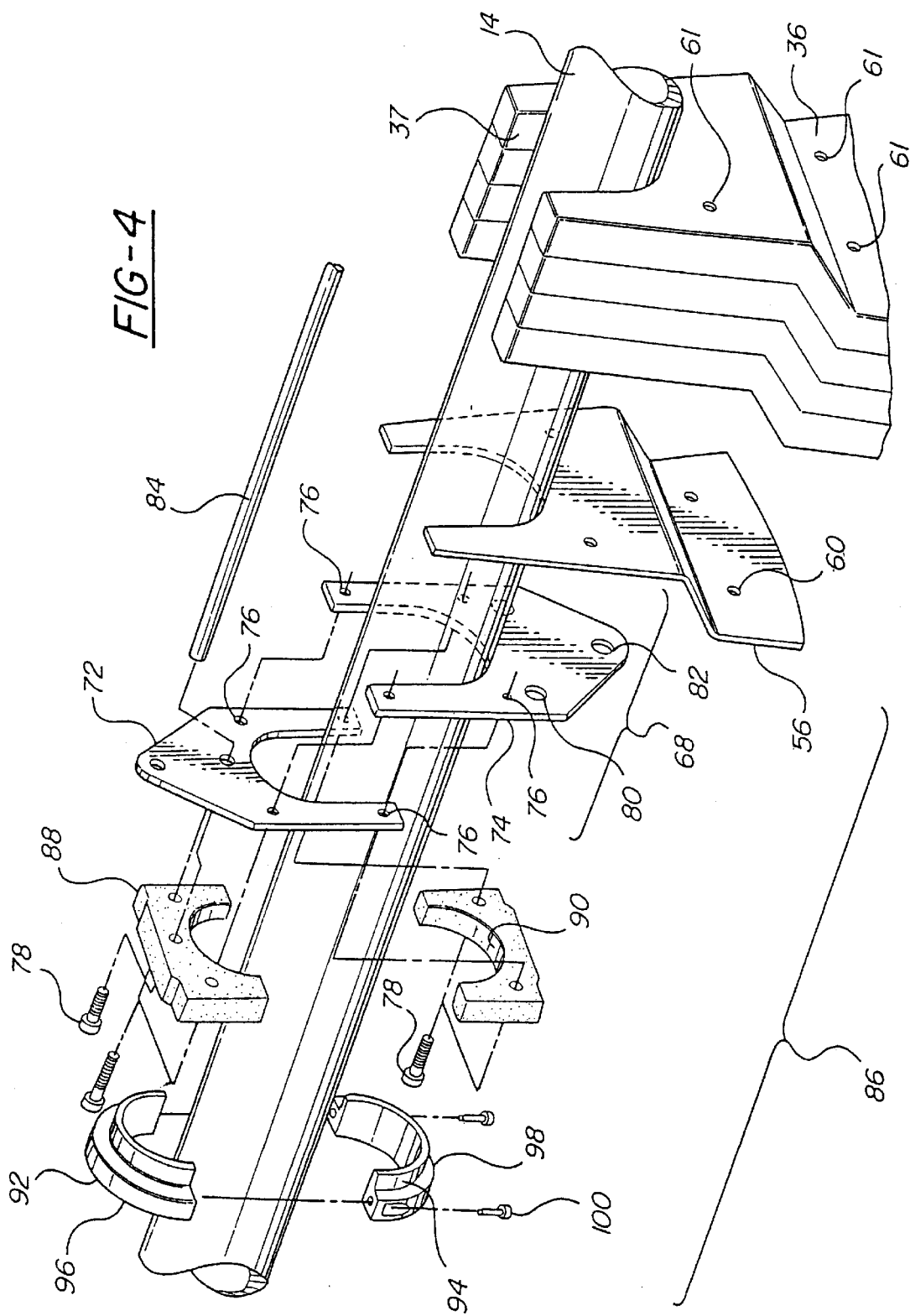
FIG. 4 is an exploded perspective view of the rotatable bearing assembly and end of the curtain-type laundering implement of FIG. 3.
Figure 5:
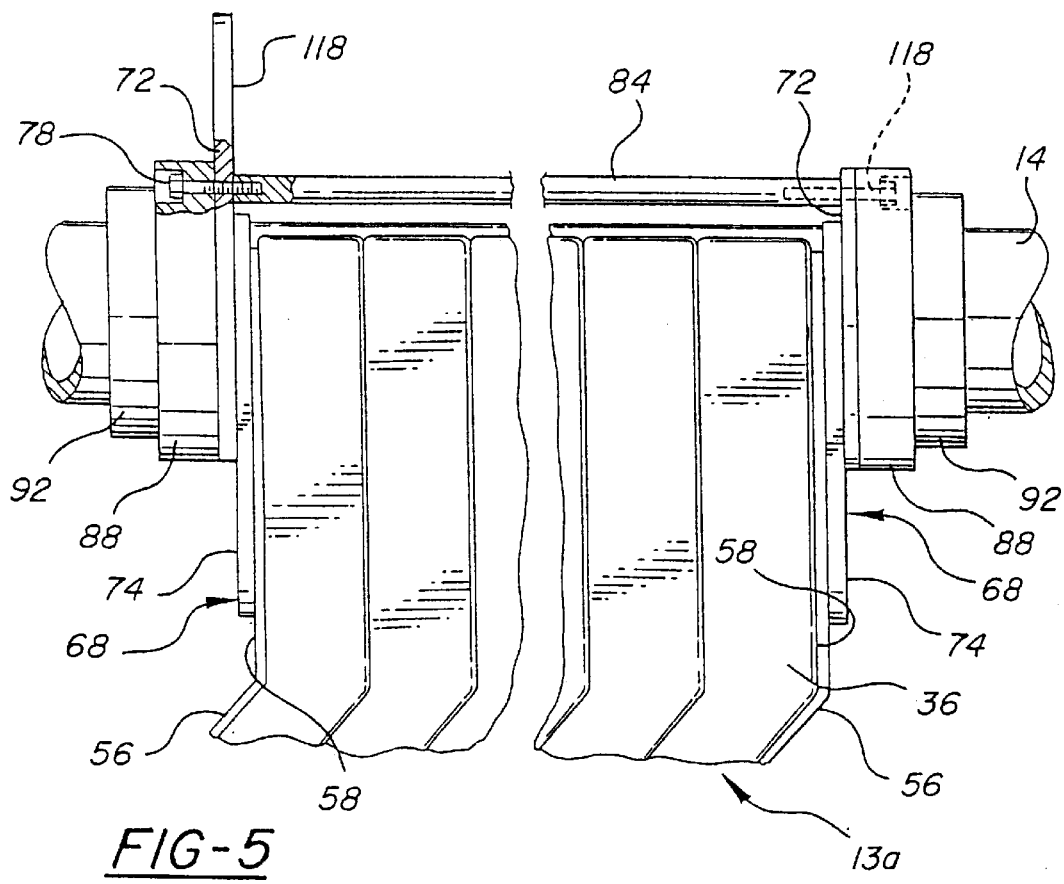
FIG. 5 is an elevation view of a horizontally stacked or sandwiched spacer grouping mounted for rotation about a frame member according to the present invention.
Figure 6:
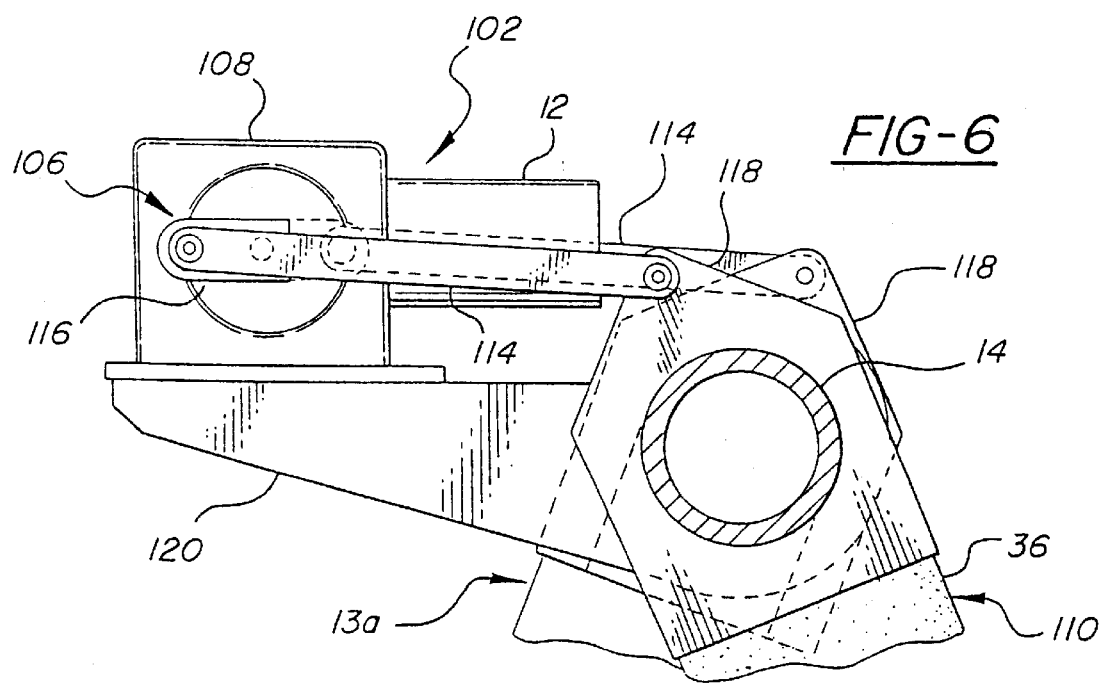
FIG. 6 is a side elevation view of an oscillating motor for driving the curtain assembly according to the present invention with respect to the frame member.

Spacers 36 have open-ended channels 37 formed at the top ends to receive in spaced, non-contacting relation therein the cross beam 14 as best shown in FIG. 4. Once integrated into a unitary curtain bank, the spacers 36 and element 16 are rotatably supported on beam 14 by means of end bearings made up of two-part metal inner bearing elements 92,94 and two part plastic outer bearing elements 88,90, the former being mechanically secured to beam 14 and the latter being secured to the curtain bank 11a or 11b. An assembled unit is shown in FIG. 5.

Figure 2:
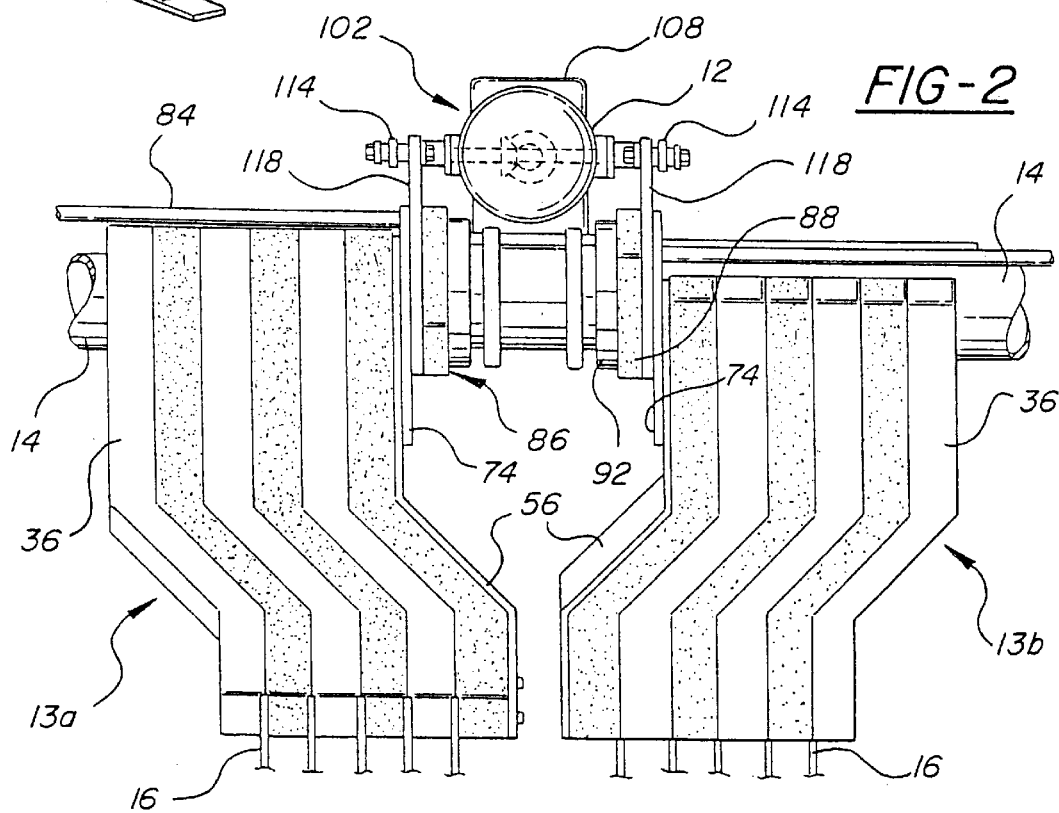
FIG. 2 is a detailed elevation view of a portion of the curtain assembly of FIG. 1.

Finally, the curtain banks 11a and 11b are oscillated fore and aft by a motor and crank system 102 which is mounted on arms 120 welded to beam 14 near the center, the overall arrangement being such that the mass center of the entire structure is at or very near the geometric center of beam 14. As shown in FIG. 2, the center bearings for the two interface structures 13a, 13b are relatively near one another, reducing the gap between the curtain banks 11a, 11b. Still further reduction is achieved by molding spacers 36 in an offset configuration such that the lower ends of the centermost spacers in each of the interface structures 13a, 13b are minimally separated in the final assembly of the laundering implement 10.

Describing the apparatus in greater detail, a plurality of stackable blow-molded plastic carriers or spacers 36 are arranged in mirror-image fashion to form the interface structures 13a, 13b. Spacers 36 are of a color or colors selected to provide a visual contrast with the color of the non-movable portions of the laundering implement. Cloth elements 16 are interposed between adjacent spacers of each interface structure 13a, 13b. Anchor means 38 (see FIG. 3) is disposed on or otherwise supported by the spacers 36 adjacent their lower ends to operably engage each cloth element 16 by securely clamping the top end 18 of each element between adjacent spacers. The spacers 36 can be formed substantially identical in shape and contour to one another. The anchor means 38 can include each spacer 36 having a first face 42 with at least one ridge 22 extending outwardly from the first face 42. In addition, the anchoring means 38 can include each spacer 36 having a second face 44 with at least one complementary groove 46 formed therein for receiving the ridge 22 extending outwardly from the first face 42 of an adjacent spacer 36. Ridge 22 projects into groove 46 sufficiently to securely clamp cloth element 16. As best seen in FIG. 8, ridges 22 and grooves 46 preferably extend across substantially the full width of spacers 36 so as to engage as much of the width of elements 16 as possible. Ridges 22 and grooves 46 need be neither continuous nor linear, however, but rather may be disposed on the faces of spacers 36 in any configuration patterns so long as they serve to securely clamp the element.

FIG. 8a shows a spacer 36a wherein the ridge 22 are replaced by three pins 22a and the groove 46 is replaced by three molded-in sockets in the rear face to receive the pins of an adjacent spacer. The pins extend through holes 25 shown in FIG. 7.

Additional mating protrusions 48 and recesses or apertures 50 may be formed in opposing first and second faces, 42 and 44, of adjacent spacers or carriers 36 in order to interlock the stacked or sandwiched spacers 36 with respect to one another with sufficient rigidity to perform the desired oscillating or rotating movement. The combination of the complementary protrusions 48 and apertures 50 define means 52 for interconnecting adjacent spacers 36. Preferably, means 54 is provided for urging the spacers 36 toward one another into a cohesive single unitary assembly for oscillatory motion. The urging means 54 includes a stiffening plate 56 of a complementary shape and contour to engage an outer end face 58 of the end-most spacer 36. Stiffening plate 56 includes at least one aperture 60 extending therethrough in coaxial alignment with corresponding apertures 61 formed in the first and second faces, 42 and 44 respectively, of the stacked spacers 36 for receiving a compression member 62 extending entirely through the longitudinal length of the stacked spacers 36. Preferably, the elongated compression member 62 includes at least one end having a threaded portion 64 for receiving a nut 66 in threaded engagement therewith. Tightening the nut 66 along the threaded portion 64 of the elongated compression member 62 results in the outer stiffening plates 56 on opposite ends of the stacked spacers 36 to be compressibly clamped toward one another sandwiching the spacers 36 and interposed portions of the elements 16 between the two outer stiffening plates 56. If required for the particular application, additional compression members can be used to provide the desired rigidity. The stiffening plate 56 preferably extends over a substantial portion of the outer end face 58.

Figure 3:
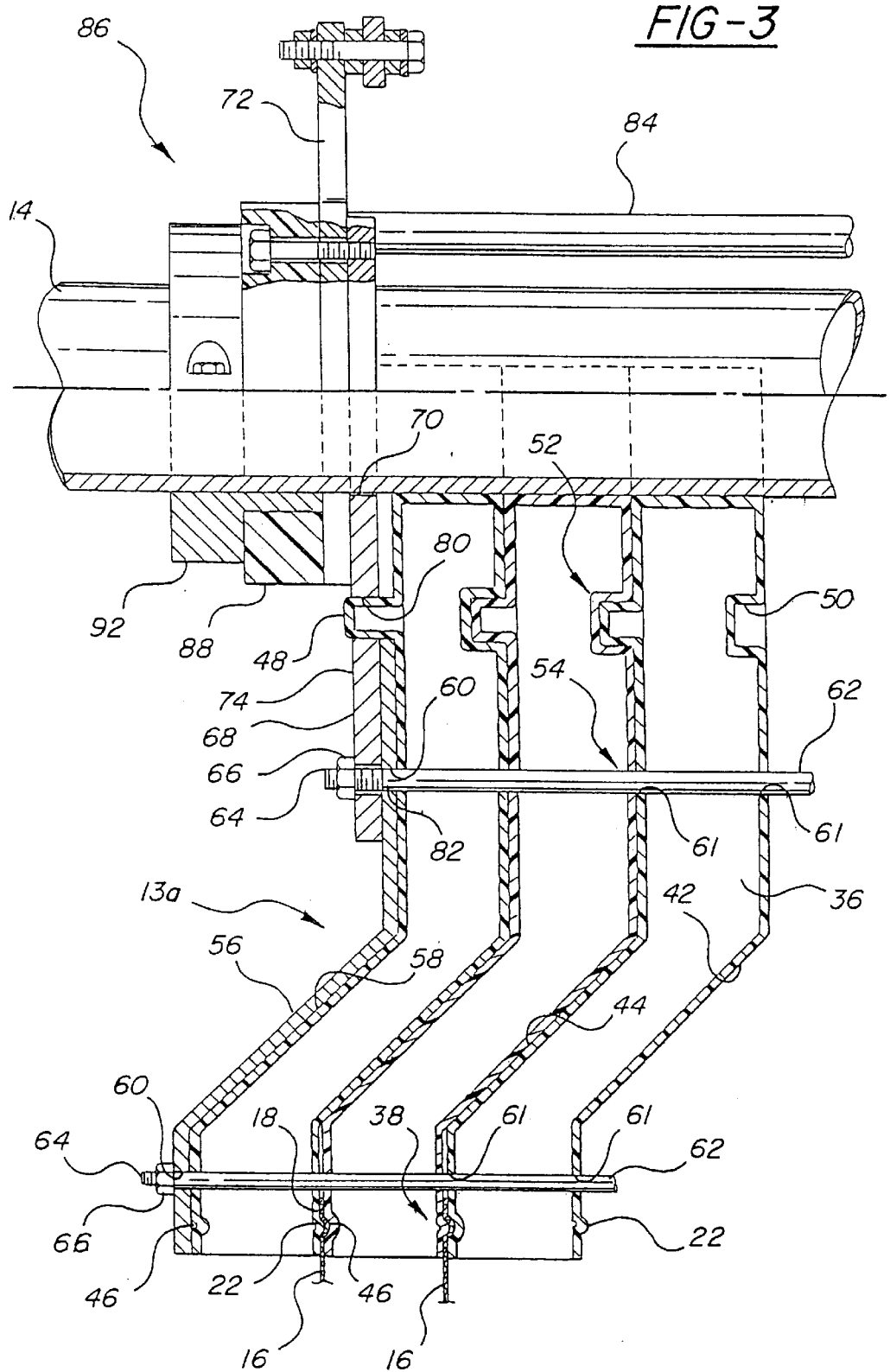
FIG. 3 is a cross-sectional detailed view of the device of FIG. 1 showing the use of synchronizing pins and tie rods between spacer bodies.

At least one end plate 68 is connected between the frame member 14 and the plurality of elongate elements 16. The end plate 68 has an aperture 70 formed therethrough sheathing a portion of the frame member 14. Preferably, the end plate 68 is formed as first portion 72 separable from a second portion 74 allowing attachment of the end plate 68 to the frame member 14 by radially sliding the first and second portions, 72 and 74 into operative engagement with one another, rather than requiring longitudinal engagement of the frame member 14 through the aperture 70. The first and second portions 72 and 74 of the end plate 68, each define a portion of the aperture 70 and are operably alignable with one another to define the aperture 70 encircling the portion of the frame member 14. As best seen in FIGS. 3 and 4, the first and second portions, 72 and 74 respectively, have a plurality of apertures 76 formed therethrough and are coaxially aligned with one another to interconnect the first and second portions to one another with suitable fasteners 78. Additional apertures 80 may be formed in the end plate 68 to receive outwardly extending protrusions 48 extending from the end most face 58 of the spacer 36. At least one compression member-receiving aperture 82 may also be formed in the end plate 68 for tying the stacked group or tier of spacers 36 with sufficient rigidity to the end plate 68. An additional tie rod or compression member 84 may be connected to the end plates 68 diametrically opposite from the stacked group of spacers 36 extending along the entire longitudinal length of the group of stacked spacers 36 for maintaining the end plates in alignment with one another and assisting in maintaining the desired compressive force to urge the spacers 36 toward one another.

Bearing means 86 is provided for rotatably mounting the end plate 68 with respect to the cross beam 14. The bearing means 86 is disposed between the end plate 68 and the cross beam 14. Preferably, the bearing means 86 includes a plastic bearing member 88 affixed to the end plate 68 for movement therewith and having an outer bearing race 90 with a diameter less than the corresponding dimension of aperture 70 formed in end plate 68. The bearing member 88 is connected to the end plate portion 72 by suitable means, such as with fasteners 78 to threadably interconnect the bearing member 88 with the first and second portions, 72 and 74, defining the end plate 68. The bearing means 86 also includes a split ring inner bearing member 92, preferably formed of wear resistant material such as aluminum or steel. The split ring inner bearing member 92 is releasibly affixed to the cross beam 14 and receives in overlying relation therewith the plastic outer bearing member 88 on an inner bearing race 94 for rotation of the end plate 68 and group of interconnected, stacked spacers 36 with respect to the longitudinal axis of the cross beam 14. The split ring inner bearing member 92 is formed as first and second diametrically split parts engageable with one another by radial movement with respect to the longitudinal axis of the beam 14 and releasibly connectable to one another for clamping engagement with the beam 14 by suitable fasteners 100, such as threaded bolts or the like. Bearing member 92 has both radial and circumferential surface portions as best shown in FIG. 3 and, therefore, serves both rotary and thrust bearing functions. Preferably, an end plate 68 and associated bearing means 86 are proved at each end of a group or tier of stacked spacers 36.

Referring now to FIGS. 1, 2 and 5–6, the cross beam 14 extends transversely with respect to a path of travel for a vehicle to be cleaned. Two banks of curtains 11a, 11b, each comprising a plurality of elongate, replaceable cloth elements 16 are rotatably mounted to the cross beam 14 by interface structures 13a, 13b such that the cloth elements 16 extend downwardly into the path of travel for the vehicle to be cleaned. Each element 16 has a sheet-like fabric body engageable with an external surface of the vehicle. Means 102 are provided for oscillating the interface structures 13a, 13b and the plurality of elongate elements 16 within the path of travel for the vehicle to be cleaned. The oscillating means 102 includes a motor 12 generally disposed near the midpoint of the cross beam 14 on parallel arms 120 which are welded to the beam 14 in minimally cantilevered fashion. Crank arm means 106 is connected between the motor 12 and interface structures 13a, 13b for shifting the structures and the cloth elements 16 along a fixed path between first and second end limits of movement. A gear box 108 may be provided between the motor 12 and the crank arm means 106 to provide the desired oscillating, unsynchronized movement. By "unsynchronized movement," it is meant that the two interface structures 13a, 13b are oscillated out of phase with respect to one another. Preferably, first and second interface structures 13a, 13b are oscillated so that oscillation of the first structure 13a is out of synch by approximately 90° with oscillation of the second structure 13b. Preferably, the interface structures 13a, 13b oscillate in movement about a common axis of rotation. The common axis of rotation can correspond to a longitudinal axis of the elongate cross beam 14. Preferably, the crank arm means 106 is connected to interface structures 13a, 13b by pivotally attaching at least one elongated link member 114 pivotally to a crank arm 116 at one end, and pivotally connecting an opposite end of the link member 114 to a radially outwardly extending portion of an enlarged end plate 118 disposed adjacent to the motor 12.

Moving parts of the oscillating means 102, such as link members 114 and end plates 68, may be colored or otherwise have signage applied thereto to further enhance the visual impact of the operating laundering implement. For example, the trade name or commercial logo of the owner or operator of the vehicle laundry facility may be displayed on a side of link members 114 so as to be visible to an observer viewing the implement from a vantage point adjacent an extended center line of cross beam 14.

The laundering implement 10 according to the present invention is assembled and reconstructed according to a method comprising the steps of interposing an end 18 of one of the cloth elements 16 between adjacent spacers 36, positioning the interposed portion of the cloth element 16 between a ridge 22 of a first spacer 36 and a groove 48 of an adjacent spacer, and compressively sandwiching the cloth element 16 between the adjacent spacers 36.

To aid in maintaining elements 16 in the proper position between the spacers 36 prior to the spacer stack being clamped together, an adhesive may be applied to the face of each spacer prior to inserting the element in position therebetween. The adhesive need only be strong enough to hold the brush elements temporarily, since it is only intended to help prevent inadvertent slippage of the elements away from the proper mounting position prior to tightening of nut 66 along the threaded portion 64 of compression member 62. Once the stack of spacers and elements is clamped together, the elements are held securely by the clamping force and/or by the engagement by ridges 22 and grooves 48. Adhesive is not required if pins 22a are used.

The present invention also encompasses a method for assembling and reconstructing a laundering implement 10 for use in cleaning an external surface of a vehicle comprising the steps of interposing at least a portion of a cloth element 16 between adjacent spacers 36, inserting the interposed portion of the cloth element 16 between a ridge 22 and a groove 48 of adjacent spacers 36, and compressively sandwiching the cloth element 16 between the adjacent spacers 36.

While applicants prefer the use of the simple, arch-like support structure 14 in combination with the spacers 36, it is to be understood that more conventional racks may be suspended for oscillation from the beam 14 to gain the advantages of cleaner, less "busy" appearance and reduced construction complexity, but without using the spacers 36. The addition of contrasting color to the oscillatingly movable interface structure connecting the cloth elements to the support structure is also usable on more conventional racks to increase the visual impact and attractiveness of such implements.

Referring now to FIG. 9, an alternative embodiment of the invention is shown in which two parallel cross beams 121 and 122 are shown mounted between end plates 124 on the top of spaced apart uprights 136. Cross beam 121 supports interface structures 126 and 128 in the manner described previously with respect to FIGS. 1–6 and these interface structures are set in motion by the drive motor 130. Parallel cross beam 122 supports two additional interface structures of which only interface structure 132 is visible. Interface structures 126 and 132 are oriented in parallel and are synchronized in motion by means of a tie bar 134 having pivotal connections at the end point to ensure that the two interface structures 126 and 132, and the depending cloth strips secured thereby, move in parallel synchronism. Interface structure 128 is similarly connected to the fourth interface structure which is behind the structures shown in the drawing. In this fashion, four sets of interface structures and four sets of depending cloth elements are provided to increase the scrubbing action of the laundry curtain on the vehicle surface.

To enhance the side view of the structure and to bring a color component through when viewed from the side, windows 138 are formed in the end plates of the interface structures such that the colors of the outermost spacers show through.

Referring now to FIG. 10, a still further embodiment of the invention is shown in which the interface structures 142, 144, 146 and 147, and two additional interface structures behind those apparent in this view, are mounted for transverse movement. To achieve this, longitudinally oriented parallel and spaced apart bearing beams 139, 140 and 141 are mounted on top of a cross beam 148. Each longitudinal bearing beam supports two interface structures arranged to straddle the cross beam 148 and all of the interface structures on one side of the cross beam 148 are tied together by means of tie rods 150. Similarly, all of the interface structures on the opposite side of the cross beam 148 are tied together for synchronized movement with one another. Again, color windows 152 are formed in the end plates for the purposes described above with reference to FIG. 9.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of assembling and reconstructing a laundering implement for use in cleaning an external surface of the vehicle comprising the steps of:

providing a plurality of substantially rigid spacer bodies having complemental configurations to interfit with one another in face to face relationship;

providing a plurality of elongate non-woven synthetic cloth cleaning elements of a thickness substantially less than the thickness of said spacers;

interposing a portion of said elements between adjacent spacers;

compressing said spacers toward one another to hold the interposed portions of said elements therebetween; and mounting the compressed spacers and elements as a unitary assembly for oscillatory motion over a vehicle laundering area so that the elements depend flexibly into said area and are oscillated to and from through said area in an edgewise fashion.

2. The method of claim 1 further comprising the step of: driving said unitary assembly in an oscillatory manner.

3. The method of claim 1 wherein the spacers are hollow plastic bodies of elongate complementally interfitting biplanar configuration, said bodies being filled with a color imparting material.

\* \* \* \* \*